(12) United States Patent  
Lee et al.

(10) Patent No.: US 11,145,462 B2  
(45) Date of Patent: Oct. 12, 2021

(54) CAPACITOR COMPONENT

(71) Applicant: SAMSUNG ELECTRO-MECHANICS CO., LTD., Suwon-si (KR)

(72) Inventors: Jong Ho Lee, Suwon-si (KR); Jung Tae Park, Suwon-si (KR); Hee Ju Son, Suwon-si (KR); Min Woo Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 16/658,652

(22) Filed: Oct. 21, 2019

(65) Prior Publication Data

US 2021/0005385 A1 Jan. 7, 2021

(30) Foreign Application Priority Data

Jul. 2, 2019 (KR) .......................... 10-2019-0079454

(51) Int. Cl.

| | |
|---|---|
| *H01G 4/232* | (2006.01) |
| *H01G 4/30* | (2006.01) |
| *H01G 4/248* | (2006.01) |
| *H01G 4/012* | (2006.01) |
| *H01G 4/008* | (2006.01) |
| *H01G 4/12* | (2006.01) |

(52) U.S. Cl.
CPC ............ *H01G 4/2325* (2013.01); *H01G 4/012* (2013.01); *H01G 4/248* (2013.01); *H01G 4/30* (2013.01); *H01G 4/0085* (2013.01); *H01G 4/1227* (2013.01)

(58) Field of Classification Search
None  
See application file for complete search history.

(56) References Cited

U.S. PATENT DOCUMENTS

| | | | |
|---|---|---|---|
| 9,373,446 B2 * | 6/2016 | Park .......................... H01G 4/30 |
| 10,290,423 B2 * | 5/2019 | Kim ...................... C01B 32/182 |
| 10,629,379 B2 * | 4/2020 | Cho .......................... H01G 4/30 |
| 2013/0045385 A1 * | 2/2013 | Kim .......................... B22F 1/02 |
| | | | 428/403 |

(Continued)

FOREIGN PATENT DOCUMENTS

| | | |
|---|---|---|
| JP | 2016-185902 A | 10/2016 |
| KR | 10-2013-0123848 A | 11/2013 |

(Continued)

*Primary Examiner* — Dion Ferguson  
(74) *Attorney, Agent, or Firm* — Morgan, Lewis & Bockius LLP

(57) ABSTRACT

A capacitor component includes a body including a dielectric layer, a layering portion in which first and second internal electrodes opposing each other are layered in a first direction, and first and second connecting portions disposed on both surfaces of the layering portion taken in a second direction perpendicular to the first direction and connected to the first and second internal electrodes, respectively; and first and second external electrodes disposed on the first and second connecting portions, respectively, and the first and second external electrodes include metal powder particles, a surface of each of which is coated with at least one of graphene and carbon nanotubes.

16 Claims, 11 Drawing Sheets

(56) References Cited

U.S. PATENT DOCUMENTS

| | | | |
|---|---|---|---|
| 2013/0194006 A1* | 8/2013 | Yamamoto | H03K 3/013 327/109 |
| 2013/0294006 A1 | 11/2013 | Kang et al. | |
| 2015/0021073 A1* | 1/2015 | Kim | H01G 2/065 174/258 |
| 2015/0068794 A1* | 3/2015 | Kang | H01G 4/2325 174/260 |
| 2015/0187500 A1* | 7/2015 | Kang | H01G 4/2325 174/260 |
| 2016/0093442 A1* | 3/2016 | Nagamoto | H01G 4/2325 361/301.4 |
| 2017/0011852 A1* | 1/2017 | Miyazaki | H01G 4/30 |
| 2018/0096791 A1* | 4/2018 | Nishisaka | H01G 4/232 |
| 2018/0144863 A1* | 5/2018 | Kim | C01B 32/23 |
| 2018/0190433 A1* | 7/2018 | Cho | H01G 4/30 |
| 2019/0272955 A1* | 9/2019 | Oh | H01G 4/30 |
| 2019/0355518 A1* | 11/2019 | Harada | H01G 4/30 |
| 2020/0090865 A1* | 3/2020 | Kim | H01G 4/248 |

FOREIGN PATENT DOCUMENTS

| | | |
|---|---|---|
| KR | 10-2018-0079807 A | 7/2018 |
| KR | 10-1891141 A | 8/2018 |

\* cited by examiner

CAPACITOR COMPONENT

CROSS-REFERENCE TO RELATED APPLICATION(S)

This application claims the benefit of priority to Korean Patent Application No. 10-2019-0079454 filed on Jul. 2, 2019 in the Korean Intellectual Property Office, the disclosure of which is incorporated herein by reference in its entirety.

TECHNICAL FIELD

The present disclosure relates to a capacitor component.

BACKGROUND

A multilayer ceramic capacitor (MLCC), a capacitor component, has a small size and high capacitance, and may be easily mounted.

Generally, when external electrodes are formed in an MLCC, a paste including a conductive metal may be used, and a surface of a body on which an internal electrode is exposed may be dipped in the paste.

However, a thickness of an external electrode formed by the dipping method may not be uniform, and a thickness of an external electrode may be excessively reduced on a corner of a body. Also, when a plating layer is formed on an external electrode, a plating solution may permeate into a body, which may decrease reliability of an MLCC.

To address the issues described above, an external electrode may be divided into a primary external electrode and a secondary external electrode, and the primary external electrode may be formed by a transcribing process, or the like. However, when the above-described method is used, a contact area between an internal electrode and an external electrode may be reduced as compared to using a general method, and accordingly, resistance and ESR may increase.

SUMMARY

An aspect of the present disclosure is to provide a capacitor component having improved moisture resistance reliability and having reduced ESR by improving electrical conductivity.

According to an aspect of the present disclosure, a capacitor component is provided, the capacitor component including a body including a dielectric layer, a layering portion in which first and second internal electrodes opposing each other are layered in a first direction, and first and second connecting portions disposed on both surfaces of the layering portion taken in a second direction perpendicular to the first direction and connected to the first and second internal electrodes, respectively; and first and second external electrodes disposed on the first and second connecting portions, respectively. The first and second external electrodes include metal powder particles, a surface of each of which is coated with at least one of graphene and carbon nanotubes.

According to an aspect of the present disclosure, a method of manufacturing a capacitor component is provided, the method including forming a body by transcribing first and second connecting portions in a second direction perpendicular to a first direction to be connected to first and second internal electrodes of a sintered body in which a dielectric layer and the first and second electrodes are layered in the first direction; and forming first and second external electrodes on the first and second connecting portions, respectively. The first and second external electrodes include metal powder particles, a surface of each of which is coated with at least one or more of graphene and carbon nanotubes.

BRIEF DESCRIPTION OF DRAWINGS

The above and other aspects, features, and advantages of the present disclosure will be more clearly understood from the following detailed description, taken in conjunction with the accompanying drawings, in which:

FIG. 5A is a cross-sectional diagram illustrating a first internal electrode, and FIG. 5B is a cross-sectional diagram illustrating a second internal electrode;

DETAILED DESCRIPTION

Figure 1:
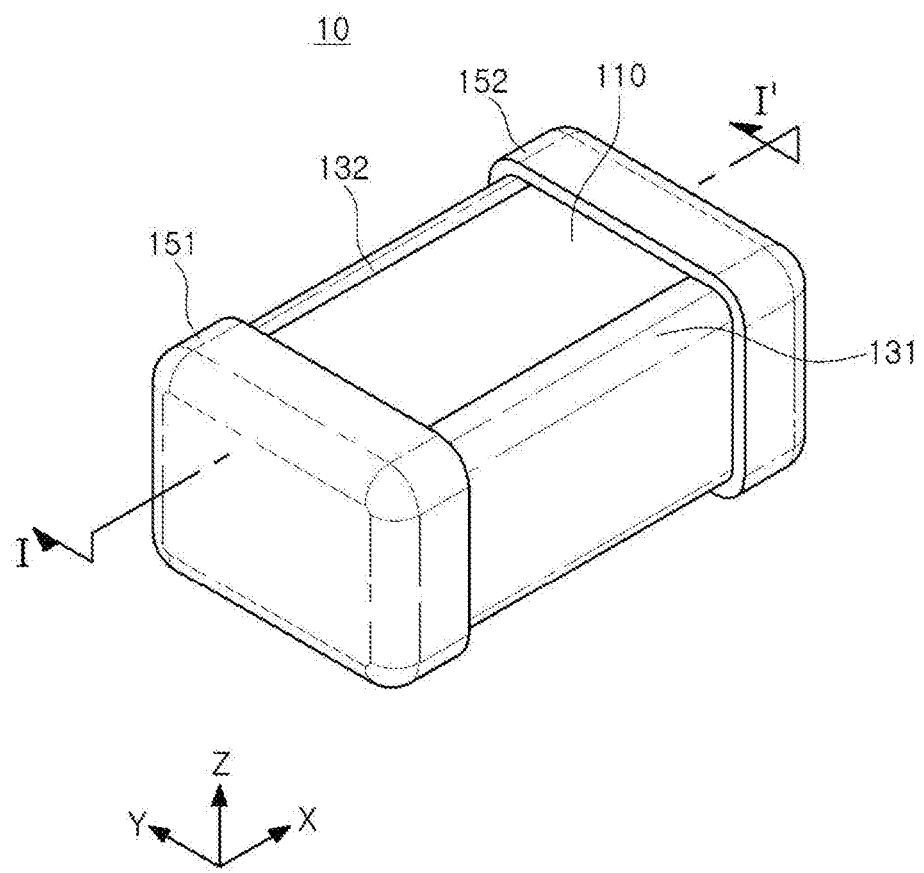
FIG. 1 is a perspective diagram illustrating a capacitor component according to an example embodiment of the present disclosure.

Hereinafter, embodiments of the present disclosure will be described as follows with reference to the attached drawings.

These embodiments are described in sufficient detail to enable those skilled in the art to practice the invention. It is to be understood that the various embodiments of the invention, although different, are not necessarily mutually exclusive. For example, structures, shapes, and sizes described as examples in embodiments in the present disclosure may be implemented in another example embodiment without departing from the spirit and scope of the present disclosure. Shapes and sizes of elements in the drawings may be exaggerated for clarity of description, and the same elements will be indicated by the same reference numerals.

For clarity of description, some elements may be omitted or briefly illustrated, and thicknesses of elements may be magnified to clearly represent layers and regions. It will be understood that when a portion "includes" an element, it can further include another element, not excluding another element, unless otherwise indicated.

In the diagram, an X direction may be defined as a second direction, an L direction, or a length direction, a Y direction may be defined as a third direction, a W direction, or a width direction, and a Z direction may be defined as a first direction, a T direction, or a thickness direction.

FIG. 1 is a perspective diagram illustrating a capacitor component according to an example embodiment.

Figure 2:
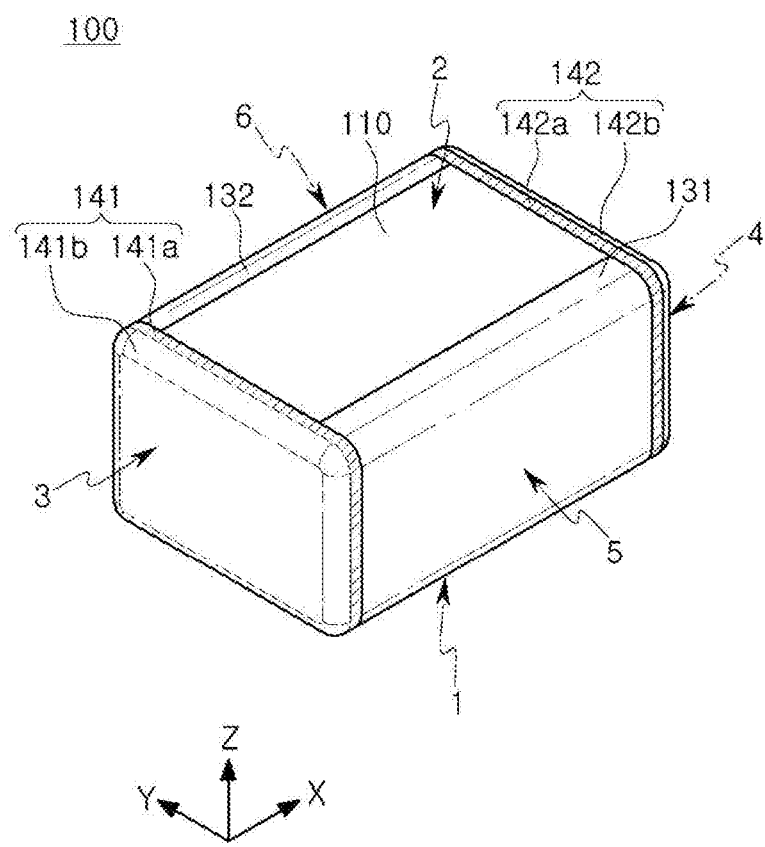
FIG. 2 is a perspective diagram illustrating the body illustrated in FIG. 1.

FIG. 2 is a perspective diagram illustrating the body illustrated in FIG. 1.

Figure 3:
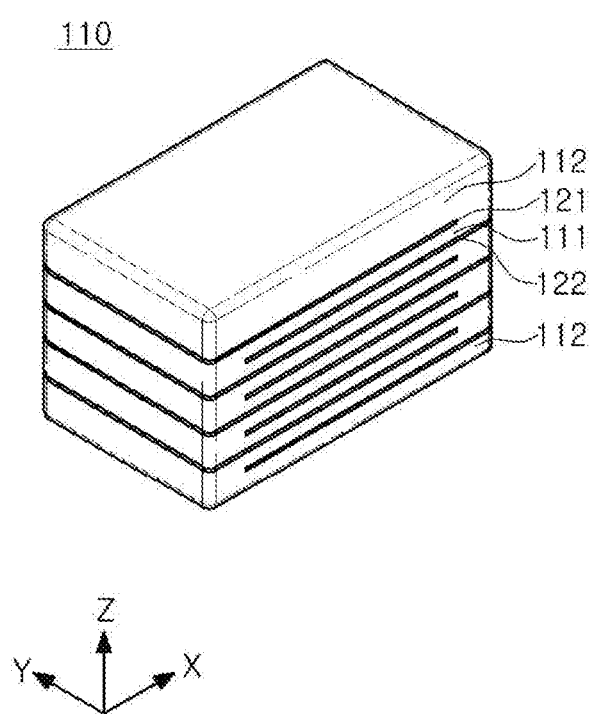
FIG. 3 is a perspective diagram illustrating the layering portion illustrated in FIG. 1.

FIG. 3 is a perspective diagram illustrating the layering portion illustrated in FIG. 1.

Figure 4:
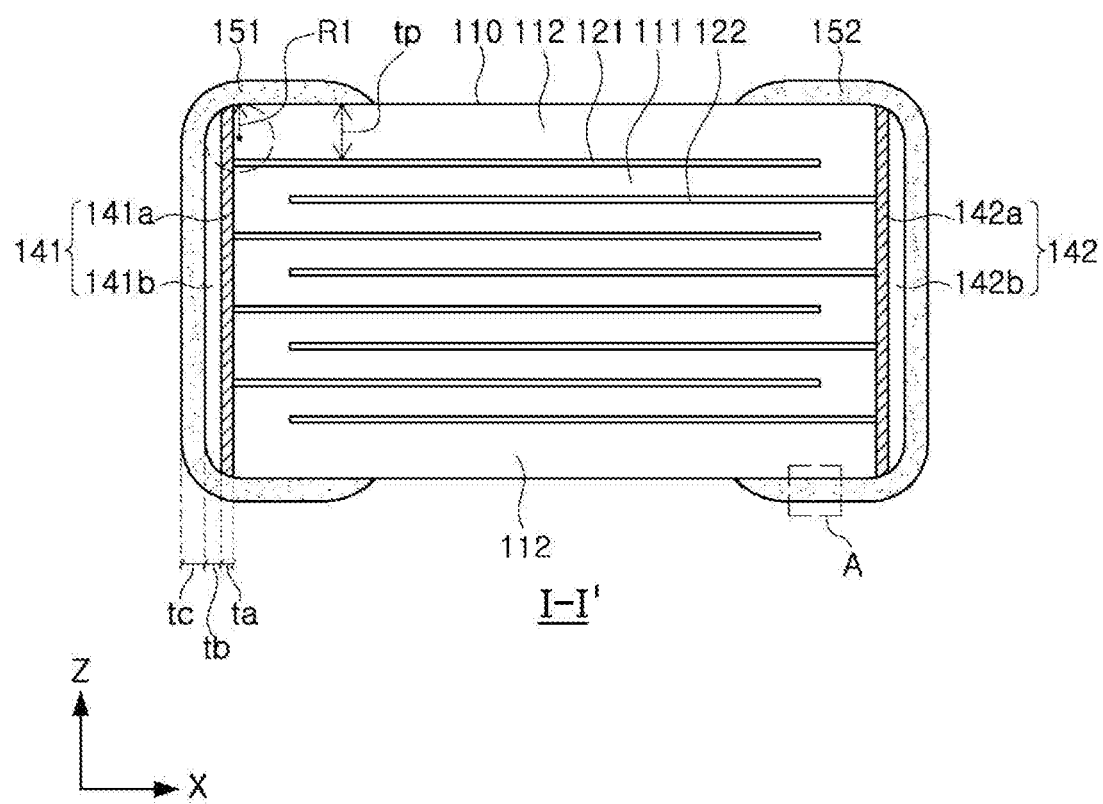
FIG. 4 is a cross-sectional diagram taken along line I-I' in FIG. 1.

FIG. 4 is a cross-sectional diagram taken along line I-I' in FIG. 1.

Figure 5A:
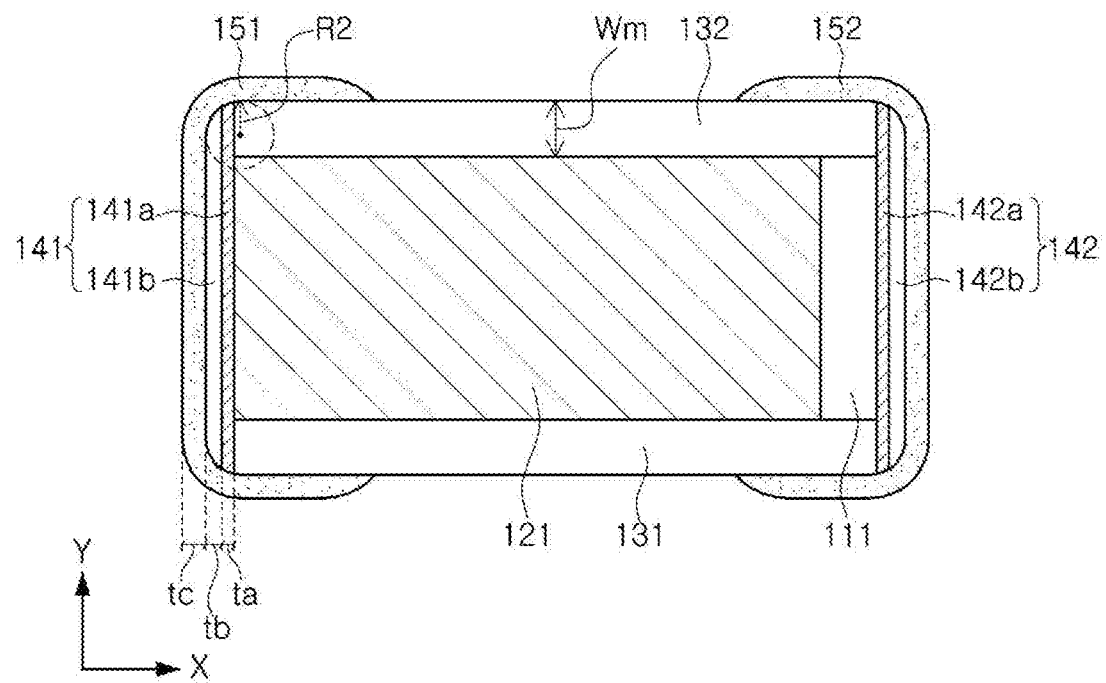
FIGS. 5A and 5B are cross-sectional diagrams taken in an X direction and a Y direction illustrated in FIG. 1.
Figure 5B:
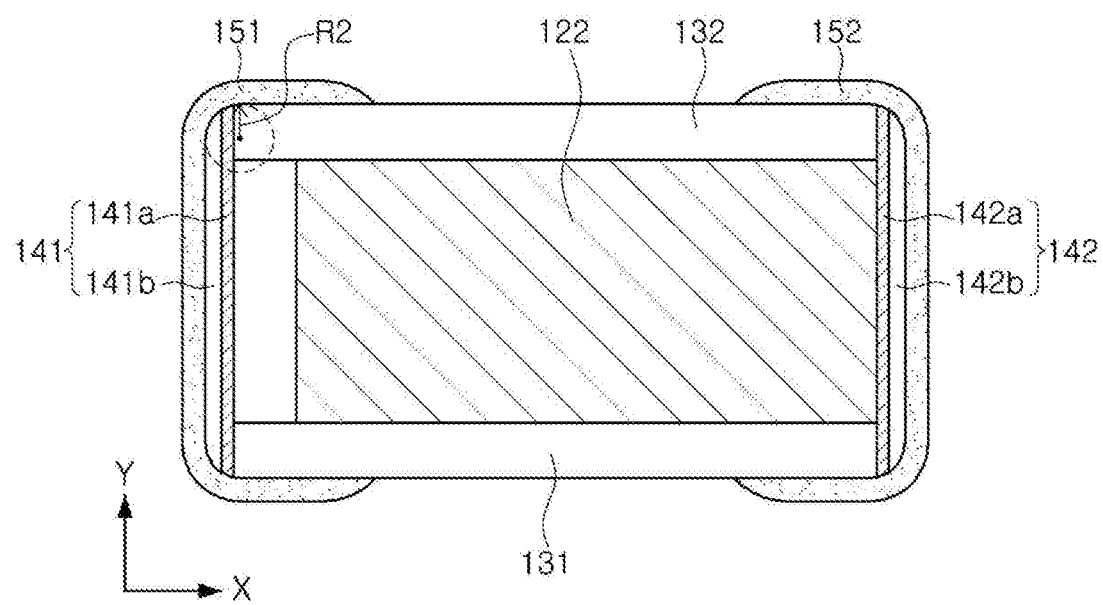

FIGS. 5A and 5B are cross-sectional diagrams taken in an X direction and a Y direction illustrated in FIG. 1. FIG. 5A is a cross-sectional diagram illustrating a first internal electrode, and FIG. 5B is a cross-sectional diagram illustrating a second internal electrode.

Figure 6:
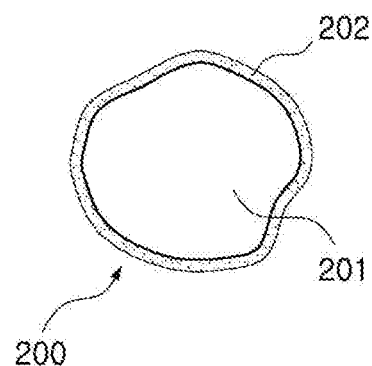
FIG. 6 is a diagram illustrating a metal powder particle, a surface of which is coated with graphene, according to an example embodiment of the present disclosure.

FIG. 6 is a diagram illustrating a metal powder particle, a surface of which is coated with graphene, according to an example embodiment.

Figure 7:
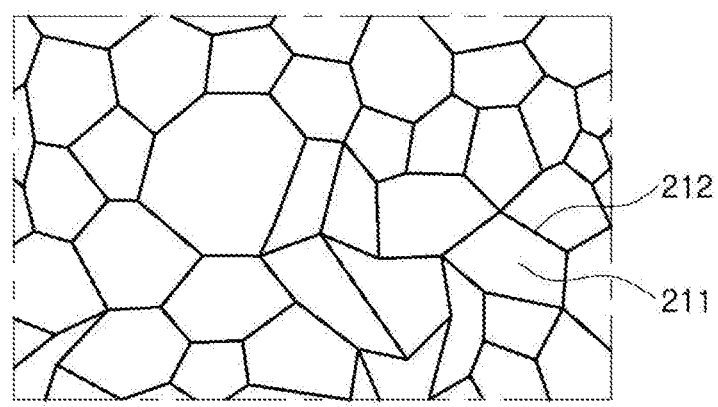
FIG. 7 is a diagram illustrating an external electrode including metal powder particles, a surface of each of which is coated with graphene, according to an example embodiment of the present disclosure.

FIG. 7 is a diagram illustrating an external electrode including metal powder particles, a surface of each of which is coated with graphene, according to an example embodiment.

In the description below, a capacitor component will be described in greater detail with reference to FIGS. 1 to 7.

A capacitor component 10 may include a body 100 including a dielectric layer 111, a layering portion 110 in which first and second internal electrodes 121 and 122 are layered in a first direction (Z direction), and first and second connecting portions 141 and 142 disposed on both surfaces of the layering portion in a second direction (X direction) perpendicular to the first direction and connected to the first and second internal electrodes 121 and 122, respectively, and first and second external electrodes 151 and 152 disposed on the first and second connecting portions 141 and 142, respectively. The first and second external electrodes 151 and 152 may include metal powder particles, and a surface of each of the metal powder particles is coated with one of graphene and carbon nanotubes.

A material of the metal powder is not limited to any particular material as long as the metal powder may be used for an external electrode of a capacitor component. For example, the metal powder may include one or more materials selected from among a group consisting of silver (Ag), palladium (Pd), gold (Au), platinum (Pt), nickel (Ni), copper (Cu), tin (Sn), tungsten (W), titanium (Ti), and alloys thereof, but a material of the metal powder is not limited thereto.

In the example embodiment, the term "graphene" may refer to a material in which carbon atoms are arranged and connected to one another in hexagonal form by sp2 combination on a two-dimensional phase, and may have a thickness corresponding to a carbon atom layer. Graphene may have a structure in which separated carbon atoms from graphite having a three-dimensional structure, a carbon allotrope, may be connected to one another in a form of a hexagonal honeycomb and may form a two-dimensional planar structure.

In the example embodiment, graphene may be implemented by one or more materials selected from among a group consisting of high-quality graphene (HQG), graphene oxide, (GO), and reduced graphene oxide (RGO), and high-quality graphene may refer to graphene in which formation of a domain boundary is prevented.

In the example embodiment, carbon nanotubes may refer to a material in which carbon atoms form a cylindrical shaped nano-structure by sp2 combination, and may refer to a graphite allotrope having a three-dimensional structure.

The carbon nanotubes may be implemented as a single wall carbon nanotube (SWNT) and/or a multiple wall carbon nanotube (MWNT), but an example of the carbon nanotubes is not limited thereto.

FIG. 6 is a diagram illustrating a metal powder particle coated with graphene according to an example embodiment. Referring to FIG. 6, a metal powder particle 201, a surface of which is coated with graphene 202, may include a structure in which the graphene 202 layer may be formed on a surface of the metal powder particle 201. The graphene layer may refer to a coating layer formed of graphene.

A method of forming the metal powder particle, a surface of which is coated with graphene or carbon nanotubes, is not limited to any particular method. For example, the metal powder particles may be formed by mixing metal powder particles with graphene and/or carbon nanotubes, and milling the mixture. When metal powder particles and graphene and/or carbon nanotubes are mixed and milled, metal powder particles and graphene and/or carbon nanotubes may move and may be mixed with each other in accordance with strong back-and-forth movement or rotation movement. As graphene has an extremely thin planar structure, and carbon nanotubes has an extremely thin linear structure, graphene and/or carbon nanotubes may be uniformly attached to a surface of the metal powder particle by physical collision or electrostatic attraction. The milling method is not limited to any particular method. For example, a ball mill, a jet mill, and the like, may be used.

When the above-described milling method is used, graphene and carbon nanotubes may form a composite structure. The notion that graphene and carbon nanotubes may form a composite structure may indicate that graphene and carbon nanotubes may be connected to each other in a mixed state, and an end portion of carbon nanotubes may be connected to graphene. In consideration of a structural aspect of carbon nanotubes and graphene, carbon nanotubes and graphene may form a contact path between particles thereof, and accordingly, a conductive path may be formed effectively.

FIG. 7 is an enlarged diagram illustrating portion A illustrated in FIG. 4, illustrating an external electrode including metal powder particles, a surface of each of which is coated with graphene. Referring to FIG. 7, when an external electrode is formed of a conductive paste including metal powder particles, a surface of each of which is coated with graphene, a graphene layer and/or carbon nanotubes layer 212 may be distributed between particles of the metal powder 211. That is because, as melting points of graphene and/or carbon nanotubes are 3000° C. or higher, graphene and/or carbon nanotubes may not be thermally decomposed or melted at a temperature at which an external electrode is sintered, and graphene and/or carbon nanotubes may be uniformly distributed in an external electrode after a sintering process. Each carbon atom included in graphene and/or carbon nanotubes may share a half of a pair of electrons with an adjacent carbon and may be combined with the carbon, and electrons which have not been combined may easily move in graphene and/or carbon nanotubes. Accordingly, the metal powder particle, a surface of which is coated with graphene and/or carbon nanotubes, may exhibit high electrical conductivity. Also, in the capacitor component in the example embodiment, by applying the metal powder particles, a surface of each of which is coated with graphene and/or carbon nanotubes, to an external electrode, an electrical path may improve such that equivalent series resistance (ESR) may decrease.

In the example embodiment, the body 100 may include a layering portion 110, and first and second connecting portions 141 and 142.

A shape of the body 100 may not be limited to any particular shape, and the body 100 may have a hexahedral shape or a shape similar to a hexahedron. Due to contraction of ceramic powder included in the body 100 during a sintering process, the body 100 may not have an exact hexahedral shape with straight lines, but may have a substantially hexahedral shape. The body 100 may have a first surface 1 and a second surface 2 opposing each other in a thickness direction (Z direction), a third surface 3 and a fourth surface 4 connected to the first surface 1 and the second surface 2 and opposing each other in a length direction (X direction), and a fifth surface 5 and a sixth surface 6 connected to the first surface 1 and the second surface 2 and the third surface 3 and the fourth surface 4 and opposing each other in a width direction (Y direction).

In an example embodiment, in the layering portion 110, the dielectric layer 111 and the first and second internal electrodes 121 and 122 may be alternately layered, and the dielectric layer 111 and the first and second internal electrodes 121 and 122 may be layered in a first direction. A plurality of the dielectric layers 111 included in the layering portion 110 may be in a sintered state, and the dielectric layers may be integrated such that it may be difficult to identify boundaries between adjacent dielectric layers without using a scanning electron microscope (SEM).

In the example embodiment, a material of the dielectric layer 111 may not be limited to any particular material as long as sufficient capacitance can be obtained. For example, the dielectric layer 111 may be formed using a barium titanate material, a Perovskite material compound with lead (Pb), a strontium titanate material, or the like.

As the material of the dielectric layer 111, a barium titanate ($BaTiO_3$) powder, or the like, including various ceramic additives, organic solvents, coupling agents, dispersing agents, and the like, may be used depending on an intended purpose.

The layering portion may be formed by alternately layering a ceramic green sheet on which the first internal electrode 121 is printed and a ceramic green sheet on which the second internal electrode 122 is printed on the dielectric layer 111 in a thickness direction (Z direction).

In an example embodiment, a plurality of the internal electrodes 121 and 122 may oppose each other with the dielectric layer 111 interposed therebetween. The internal electrodes 121 and 122 may include the first and second internal electrodes 121 and 122 alternately disposed with the dielectric layer 111 interposed therebetween and opposing each other.

The first internal electrode 121 may only be exposed to one surface of the layering portion 110 taken in the second direction (X direction), and the portion exposed to the one surface taken in the second direction (X direction) may be connected to the metal layer 141a of the first connecting portion. The second internal electrode 122 may be exposed to the other surface of the layering portion 110 taken in the second direction (X direction), and the portion exposed to the other surface taken in the second direction (X direction) may be connected to a metal layer 142a of the second connecting portion. The first and second internal electrodes 121 and 122 may be electrically isolated from each other by the dielectric layer 111 interposed therebetween.

The first and second internal electrodes 121 and 122 may be formed of a conductive paste including one or more materials from among silver (Ag), palladium (Pd), gold (Au), platinum (Pt), nickel (Ni), tin (Sn), copper (Cu), tungsten (W), titanium (Ti), and alloys thereof, for example. As a method of printing the conductive paste, a screen printing method, a gravure printing method, or the like, may be used, but the printing method is not limited thereto.

An average thickness of the first and second internal electrodes 121 and 122 may be 0.4 μm or less. The average thickness of the first and second internal electrodes 121 and 122 may be an average of thicknesses measured in five different positions of the sintered internal electrode. A lower limit of the average thickness of the first and second internal electrodes 121 and 122 is not limited to any particular size, and may be 0.01 μm or higher, for example.

In the example embodiment, the first and second connecting portions 141 and 142 may include the metal layers 141a and 142a disposed on the layering portion 110 and ceramic layers 141b and 142b disposed on the metal layers 141a and 142a.

The metal layers 141a and 142a may be disposed on one surface and the other surface of the layering portion 110 in the second direction (X direction), respectively, and may be connected to the first and second internal electrodes 121 and 122, respectively.

The metal layers 141a and 142a may include a metal material having high electrical conductivity, and to increase electrical connectivity with the first internal electrode 121, the metal layers 141a and 142a may include the same metal as a metal included in the first internal electrode 121. For example, the metal layers 141a and 142a may include one or more of silver (Ag), palladium (Pd), gold (Au), platinum (Pt), nickel (Ni), tin (Sn), copper (Cu), tungsten (W), titanium (Ti), and alloys thereof.

The metal layers 141a and 142a may be provided in a form of sintered electrodes, and may be simultaneously sintered with the body 100. In this case, the metal layers 141a and 142a, before being sintered, may include an organic material such as metal particles and a binder and may be transcribed on the body 100, and the organic material, and the like, may be removed after a sintering process.

A thickness ta of the metal layer is not limited to any particular size, and may be 1 to 10 μm. The thickness ta of the metal layer may refer to a dimension of the metal layer taken in the second direction (X direction).

The ceramic layers 141b and 142b may be disposed on the metal layers 141a and 142a, and may improve sealing properties such that permeation of moisture or a plating solution into the body may be significantly reduced. The ceramic layers 141b and 142b may be configured to not cover surfaces of the metal layers 141a and 142a taken in the first direction (Z direction) and the third direction (Y direction).

The ceramic layers 141b and 142b may be formed of a ceramic material such as barium titanate, and the like. In this case, the ceramic layers 141b and 142b may include the same ceramic material as a material included in the dielectric layer 111, or may be formed of the same material as a material of the dielectric layer 111.

The ceramic layers 141b and 142b may be formed by a transcribing process as the metal layers 141a and 142a, and may go through a sintering process thereafter. It may be preferable for the ceramic layers 141b and 142b, before being sintered, to have high adhesive force for a transcribing process, and thus, the ceramic layers 141b and 142b may include a relatively large amount of an organic material such as a binder, and the like. In this case, as an organic material may partially remain after a sintering process, the ceramic layers 141b and 142b may include a greater amount of an organic material than an organic material included in the dielectric layer 111.

A thickness tb of the ceramic layer is not limited to any particular size, and may be 3 to 15 µm, for example. The thickness tb of the ceramic layer may refer to a dimension of the ceramic layer taken in the second direction (X direction).

In the example embodiment, the first and second connecting portions 141 and 142 may be formed by a method of transcribing a sheet, and may have a uniform thickness. Accordingly, a ratio of a minimum value of a thickness of each of the first and second connecting portions 141 and 142 to a maximum value may be 0.9 to 1.0. A thickness of each of the first and second connecting portions 141 and 142 may refer to a dimension of each of the first and second connecting portions 141 and 142 taken in the second direction (X direction).

In the example embodiment, each of corners of the body 100 may have a rounded shape on cross-sectional surfaces taken in the first and second directions. By configuring each corner of the body to have a round shape, each of the external electrodes 151 and 152 may have a reduced and uniform thickness.

When each of corners of the body has an angled shape, a chipping defect, breakage of corners caused by collisions between chips, may occur during a process of manufacturing an MLCC, which may cause an exterior defect and may degrade moisture resistance reliability. To address the issue, generally, corners of a body may be ground to have a rounded shape to prevent a thickness of an external electrode on the corners from being reduced and to prevent a chipping defect.

However, by grinding the corners of a body, exposure of an internal electrode, or other issues, may occur such that it may be difficult to secure a sufficient round shape on each of corners of a body in a general capacitor component. Also, to prevent the exposure of an internal electrode, when a thickness of a protective portion is increased, capacitance per unit volume of a capacitor component may decrease.

In the example embodiment, by disposing the first and second connecting portions 141 and 142 on both surfaces of the layering portion 110 taken in the second direction (X direction), respectively, a sufficient round shape may be formed on the corners of the body 100. Accordingly, a thickness of an external electrode on each corner may be prevented from being reduced without a decrease of capacitance per unit volume, and a chipping defect may be prevented.

In an example embodiment, the layering portion 110 may include a capacitance forming portion, including the first and second internal electrodes 121 and 122 opposing each other with the dielectric layer 111 interposed therebetween, and a protective portion 112 disposed in an upper portion and a lower portion of the capacitance forming portion.

Upper and lower protective portions may have a composition the same as a composition of the dielectric layer 111, and may be formed by layering at least one or more dielectric layers which do not include an internal electrode in an upper portion of an uppermost internal electrode and in a lower portion of a lowermost internal electrode of the body 100.

The upper and lower protective portions 112 may prevent a damage to an internal electrode caused by physical or chemical stress.

A thickness tp of each of the upper and lower protective portions 112 may not be limited to any particular size, and in the example embodiment, as a sufficient round shape may be formed on each corner of the body 100 by disposing the connecting portions 141 and 142 in the layering portion 110, by significantly reducing the thickness tp of each of the upper and lower protective portions 112, capacitance per unit volume of the capacitor component 10 may improve.

For example, in the example embodiment, even when the thickness tp is 20 µm or less, a sufficient round shape may be formed and an internal electrode may also be protected. Accordingly, capacitance per unit volume may improve. Thus, when the thickness tp is 20 µm or less, the above-described effect may be more prominent.

A lower limit of the thickness tp is not limited to any particular size, and may be selected in consideration of a radius of curvature R1 of a corner of the body on cross-sectional surfaces taken in the first and second directions. For example, a lower limit of the thickness tp may be 5 µm or higher.

The thickness tp of each of the upper and lower protective portions 112 may refer to a dimension of each of the upper and lower protective portions 112 taken in the first direction (Z direction).

Referring to FIG. 4, when a thickness of each of the upper and lower protective portions 112 is defined as tp, and a radius of curvature of a corner of the body 100 on cross-sectional surfaces taken in the first and second directions (a Z-X cross-sectional surface and an L-T cross-sectional surface) is defined as R1, R1/tp may be 0.3 or higher and 1.4 or lower.

When R1/tp is less than 0.3, it may be impossible to form a sufficient round shape, and accordingly, a chipping defect may occur, or a thickness of an external electrode on the corner portion may decrease.

When R1/tp exceeds 1.4, a short caused by exposure of an internal electrode may occur, or it may be difficult to form an external electrode. A short caused by exposure of an internal electrode may refer to a phenomenon in which, as the corners of the body are ground, the first internal electrode 121 may be exposed to a surface on which the second external electrode 152 is disposed and may be connected to the second external electrode 152, or in which the second internal electrode 122 is exposed to a surface on which the first external electrode 151 is disposed and may be connected to the first external electrode 151.

R1/tp may be greater than 1.0 and 1.4 or less.

When the connecting portions 141 and 142 are not provided, and R1/tp is controlled to be greater than 1.0, it may be highly likely that a short caused by exposure of an internal electrode may occur. However, when the connecting portions 141 and 142 are provided as in the example embodiment, a possibility of a short caused by exposure of an internal electrode may significantly decrease even when R1/tp is controlled to be greater than 1.0 and 1.4 or less.

A rounded shape of each of corners of the body 100 on the cross-sectional surfaces taken in the first and second directions may be formed on the connecting portions 141 and 142, and as illustrated in FIGS. 3 and 4, the round shape may extend to a portion of the layering portion 110.

In an example embodiment, first and second margin portions 131 and 132 may be disposed on both surfaces (a fifth surface and a sixth surface) of the layering portion 110 taken in a third direction (Y direction) perpendicular to the first and second directions, respectively.

In a general capacitor component, an area of a dielectric layer may be configured to be greater than an area of an internal electrode, and a margin region may be formed on a remaining circumferential portion other than a portion of an internal electrode connected to an external electrode. In this case, however, when several tens to several hundreds of dielectric layers are layered, the dielectric layers may be elongated to fill a difference, and accordingly, an internal electrode may be bent. When an internal electrode is bent, breakdown voltage (BDV) properties may decrease in the respective portion.

Thus, in the capacitor component in the example embodiment, a difference caused by an internal electrode may be prevented by removing the margin regions on both surfaces of the layering portion 110 taken in the third direction, and an internal electrode may be prevented from being bent. Accordingly, the issue of a decrease of breakdown voltage (BDV) properties may be prevented, thereby improving reliability of the capacitor component.

In addition, by disposing the first and second margin portions 131 and 132 on both surfaces of the layering portion 110 taken in the third direction, the internal electrodes may be protected. Also, as the first and second margin portions 131 and 132 are separately formed, it may not be necessary to consider a manufacturing error such as disarrangement of internal electrodes, and the like. Thus, as a thickness Wm of each of the first and second margin portions 131 and 132 may be configured to be less than a thickness of a margin region in a general capacitor component, capacitance per unit volume of the capacitor component may improve.

Thus, when the body 100 includes the first and second margin portions 131 and 132, the first internal electrode 121 may be exposed to both surfaces of the layering portion 110 taken in the third direction and one surface of the layering portion 110 taken in the second direction, and the portion exposed to one surface taken in the second direction may be connected to the first connecting portion 141. Also, the second internal electrode 122 may be exposed to both surfaces of the layering portion 110 taken in the third direction and the other surface of the layering portion 110 taken in the second direction, and the portion exposed to the other surface taken in the second direction may be connected to the second connecting portion 142.

The first and second margin portions 131 and 132 may be formed of an insulating material, and may be formed of a ceramic material such as barium titanate. In this case, the first and second margin portions 131 and 132 may include the same ceramic material as a material included in the dielectric layer 111, or may be formed of the same material as a material included in the dielectric layer 111.

A method of forming the first and second margin portions 131 and 132 may not be limited to any particular method. For example, the first and second margin portions 131 and 132 may be formed by coating a slurry including ceramic, or by layering dielectric sheets on both surfaces of the layering portion, taken in the third direction, in the third direction.

The first and second margin portions 131 and 132 may also be formed by transcribing dielectric sheets using the above-described transcribing process. Accordingly, each of the first and second margin portions 131 and 132 may have a uniform thickness. When a thickness of each of the first and second margin portions 131 and 132 is defined as Wm, a ratio of a minimum value of the thickness Wm to a maximum value may be 0.9 to 1.0.

When the first and second margin portions 131 and 132 are formed by transcribing dielectric sheets, it may be preferable for the first and second margin portions 131 and 132, before being sintered, to have high adhesion force for the transcribing process. To this end, the first and second margin portions 131 and 132 may include a relatively large amount of an organic material such as a binder. In this case, as the organic material may partially remain after a sintering process, the first and second margin portions 131 and 132 may include a larger amount of an organic material than an amount of an organic material included in the dielectric layer 111.

The thickness Wm of each of the first and second margin portions 131 and 132 may not be limited to any particular size. In the example embodiment, as a sufficiently rounded shape may be formed on the corners of the body by disposing the connecting portions 141 and 142 in the layering portion 110, by significantly reducing the thickness Wm, capacitance per unit volume of the capacitor component may improve. For example, in the example embodiment, even when the thickness Wm is 15 µm or less, a sufficiently rounded shape may be formed, and the internal electrodes 121 and 122 may also be protected, thereby improving capacitance per unit volume of the capacitor component.

A lower limit of the thickness Wm may not be limited to any particular size, and may be selected in consideration of the radius of curvature R2 of the corner of the body on cross-sectional surfaces taken in the second and third directions (an X-Y cross-sectional surface and an L-W cross-sectional surface). For example, the thickness Wm may be 5 µm or greater. The thickness Wm of each of the first and second margin portions 131 and 132 may refer to a dimension of each of the first and second margin portions 131 and 132 taken in the third direction (Y direction).

Referring to FIGS. 5A and 5B, when a thickness of each of the first and second margin portions 131 and 132 is defined as Wm, and a radius of curvature of a corner of the body on the cross-sectional surfaces taken in the second and third directions (an X-Y cross-sectional surface and an L-W cross-sectional surface) is defined as R2, R2/Wm may be 0.3 or greater and 1.4 or lower. When R2/Wm is less than 0.3, a sufficient round shape may not be formed such that a chipping defect may occur or a thickness of an external electrode on the corner portion may decrease. When R2/Wm exceeds 1.4, a short caused by exposure of an internal electrode may occur, or it may be difficult to form an external electrode. A short caused by exposure of an internal electrode may refer to a phenomenon in which, as the corners of the body are ground, the first internal electrode 121 may be exposed to a surface on which the second external electrode 152 is disposed and may be connected to the second external electrode 152, or in which the second internal electrode 122 may be exposed to a surface on which the first external electrode 151 is disposed and may be connected to the first external electrode 151.

R2/Wm may be greater than 1.0 and 1.4 or lower.

When the connecting portions 141 and 142 are not provided, and R2/Wm is controlled to be greater than 1.0, it may be highly likely that a short caused by exposure of an internal electrode may occur, whereas, when the connecting portions 141 and 142 are provided as in the example embodiment, even when R2/Wm is controlled to be greater than 1.0 and 1.4 or less, a possibility of a short caused by exposure of an internal electrode may significantly decrease even when R2/Wm is controlled to be greater than 1.0 and 1.4 or less.

To easily perform a grinding process, the radius of curvature R2 of the corner of the body on the cross-sectional surfaces taken in the second and third directions may be configured to be the same as a radius of curvature R1 of the corner of the body on the cross-sectional surfaces taken in the first and second directions, but an example embodiment thereof is not limited thereto. The corners of the body may be ground such that R2 and R1 may be configured to be different.

As the first and second connecting portions 141 and 142 are formed using a transcribing process after forming the first and second margin portions 131 and 132 in the layering portion 110, the first connecting portion 141 may be disposed to cover one surfaces of the first and second margin portions 131 and 132 taken in the second direction (X direction), and the second connecting portion 142 may be disposed to cover the other surfaces of the first and second margin portions 131 and 132 taken in the second direction (X direction).

The first connecting portion 141 may be disposed within the layering portion 110 and one surfaces of the first and second margin portions 131 and 132 taken in the second direction (X direction), and the second connecting portion 142 may be disposed within the layering portion 110 and the other surfaces of the first and second margin portions 131 and 132 taken in the second direction (X direction). Accordingly, the first connecting portion 141 may not extend to both surfaces of the layering portion 110 taken in the first direction (Z direction), and may not extend to both surfaces of the first and second margin portions 131 and 132 taken in the third direction (Y direction).

The first and second external electrodes 151 and 152 may be disposed on the first and second connecting portions 141 and 142, respectively. The first external electrode 151 may be connected to the first internal electrode 121 through the metal layer 141a of the first connecting portion 141, and the second external electrode 152 may be connected to the second internal electrode 122 through the metal layer 142a of the second connecting portion 142.

The first and second external electrodes 151 and 152 may extend to both surfaces of the first and second connecting portions 141 and 142 taken in the first direction (Z direction), and the metal layers 141a and 142a of the first and second connecting portions 141 and 142 may be exposed to the surfaces of the first and second connecting portions 141 and 142 taken in the first direction (Z direction) and may be connected to the first and second external electrodes 151 and 152, respectively. The first and second external electrodes 151 and 152 may also extend to both surfaces of the first and second connecting portions 141 and 142 taken in the third direction (Y direction), and the metal layers 141a and 142a of the first and second connecting portions 141 and 142 may also be exposed to the surfaces of the first and second connecting portions 141 and 142 taken in the third direction (Y direction) and may be connected to the first and second external electrodes 151 and 152, respectively.

The first and second external electrodes 151 and 152 may extend to portions of the first surface 1 and the second surface 2 of the body. The first and second external electrodes 151 and 152 may also extend to portions of the fifth surface 5 and the sixth surface 6 of the body.

A method of forming the first and second external electrodes 151 and 152 may not be limited to any particular method. For example, the first and second external electrodes 151 and 152 may be formed by dipping the body in a paste including a conductive metal and glass. The conductive metal may include the above-described metal powder particles and/or a metal powder particle, a surface of each of which is coated with graphene.

In the example embodiment, as each of the corners of the body 100 has a rounded shape, even when an external electrode is formed using a dipping process, the phenomenon in which a thickness of each of the external electrodes 151 and 152 on the corners of the body 100 decreases may be prevented.

Thus, when a thickness of each of the first and second external electrodes 151 and 152 is defined as tc, a ratio of a minimum value of the thickness tc to a maximum value may be 0.8 to 1.0.

To improve mounting properties with a substrate, a plating layer may be formed on the first and second external electrodes 151 and 152. For example, the plating layer may be implemented by an Ni-plated layer or an Sn-plated layer, and the Ni-plated layer and the Sn-plated layer may be formed in order on the external electrodes. Alternately, the first and second external electrodes 151 and 152 may include a plurality of the Ni-plated layers and/or a plurality of the Sn-plated layers.

FIGS. 8 to 11 are diagrams illustrating processes of forming a connecting portion 141 of a capacitor component by a transcribing process according to an example embodiment.

Figure 8:
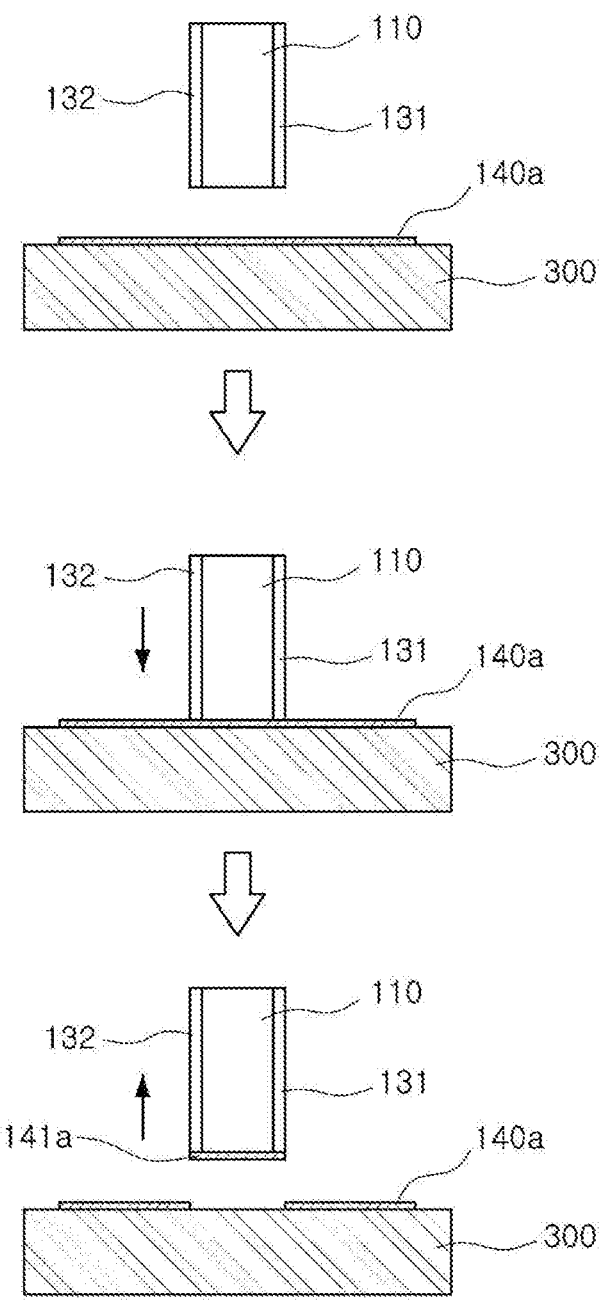
FIGS. 8 to 11 are diagrams illustrating processes for forming a connecting portion of a capacitor component using a transcribing method according to an example embodiment of the present disclosure.

As illustrated in FIG. 8, in a process of transcribing a metal layer 141a, a metal layer sheet 140a may be arranged on a support stand 300, a layering portion 110 may be compressed to the metal layer sheet 140a such that the metal layer 141a may be attached to a surface of the layering portion 110. The metal layer sheet 140a, which has not been sintered yet, may include components such as a binder, an organic solvent, and the like.

Figure 9:
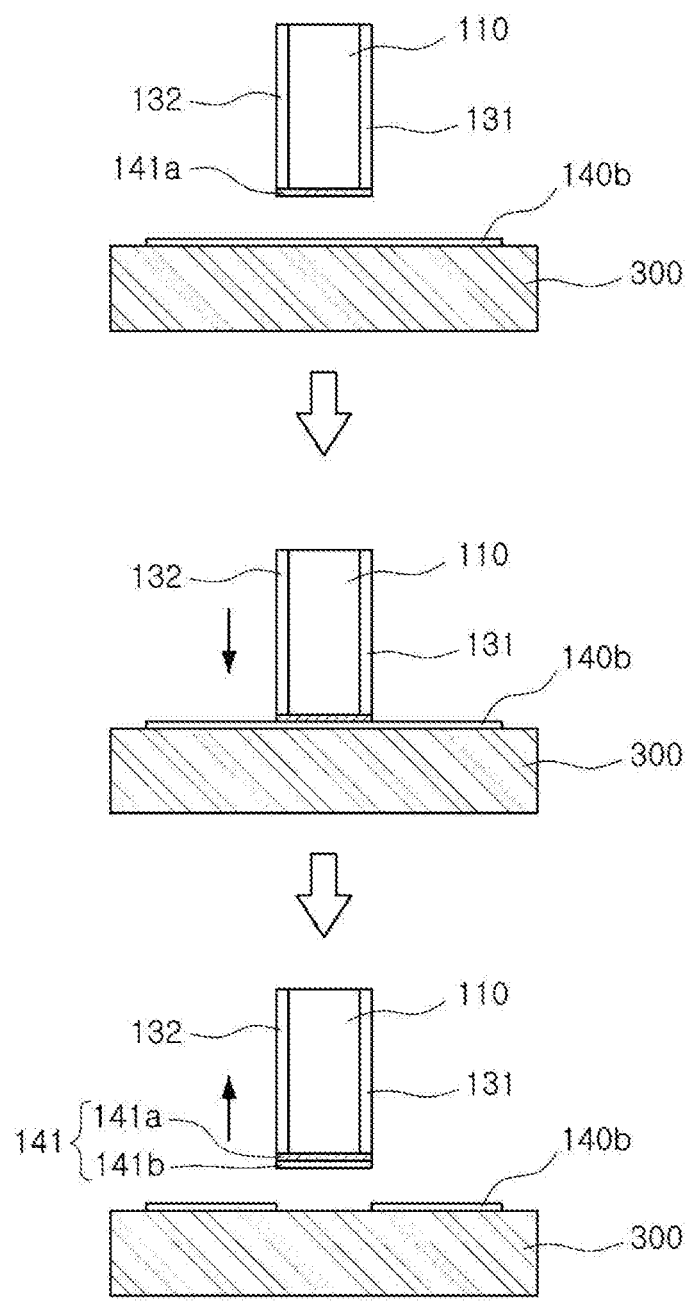

As illustrated in FIG. 9, a ceramic layer sheet 130b may be arranged on the support stand 300, the layering portion 110 may be compressed to the ceramic layer sheet 140b such that a ceramic layer sheet 141a may be attached to a surface of the metal layer 141a. The ceramic layer sheet 140b, which has not been sintered yet, may include components such as a binder, an organic solvent, and the like.

Figure 11:
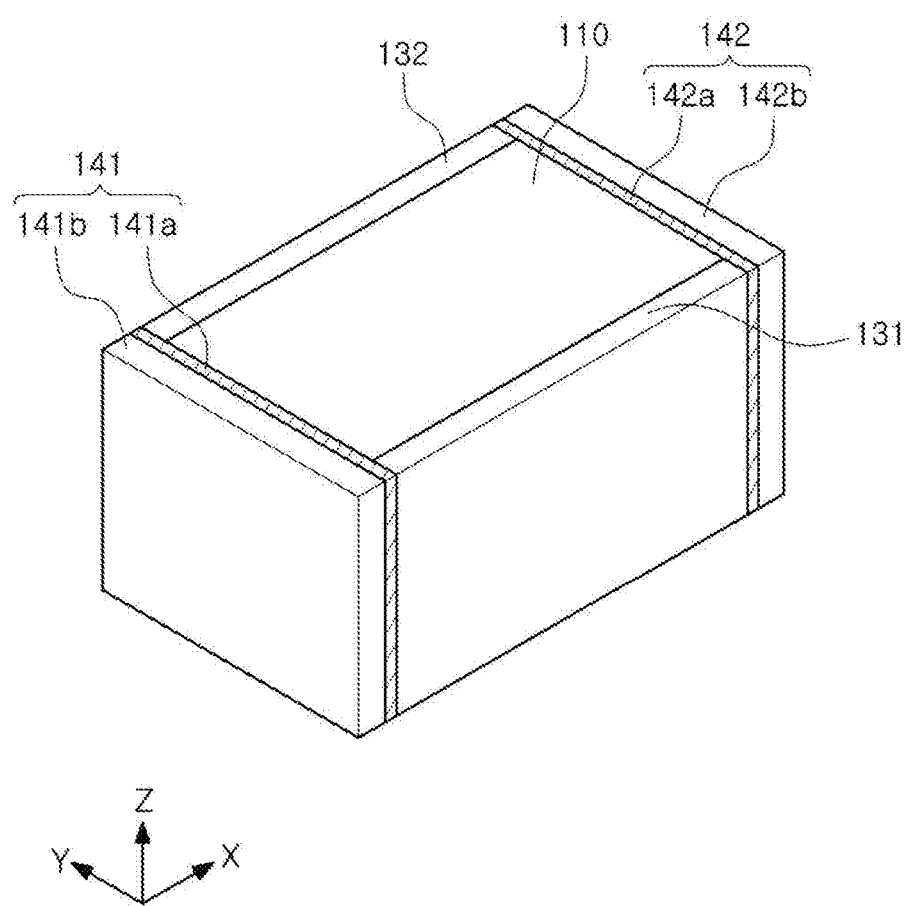

The same process may be performed on the other surface opposing the surface on which the metal layer 141a and the ceramic layer sheet 141b are disposed to form a metal layer 142a and a ceramic layer sheet 142b, thereby manufacturing the body 100 as illustrated in FIG. 11.

Each of corners of the body may be processed to have a rounded shape by performing a grinding process, and external electrodes 151 and 152 may be formed by dipping the ground body 100 into a conductive paste, thereby manufacturing a capacitor component 10.

Figure 10:
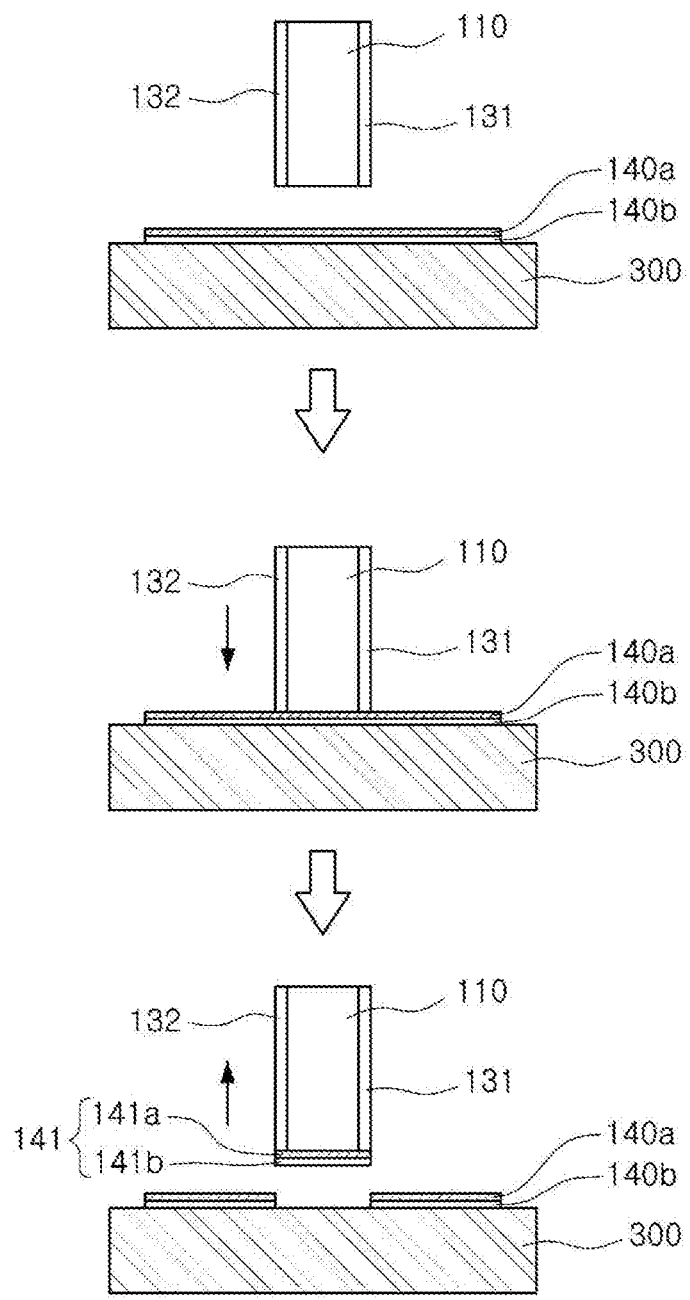

As illustrated in FIG. 10, the first connecting portion 141 may also be formed by layering the ceramic layer sheet 140b and the metal layer sheet 140a on the support stand 300 and performing a transcribing process once, rather than separately transcribing the metal layer and the ceramic layer.

Figure 12:
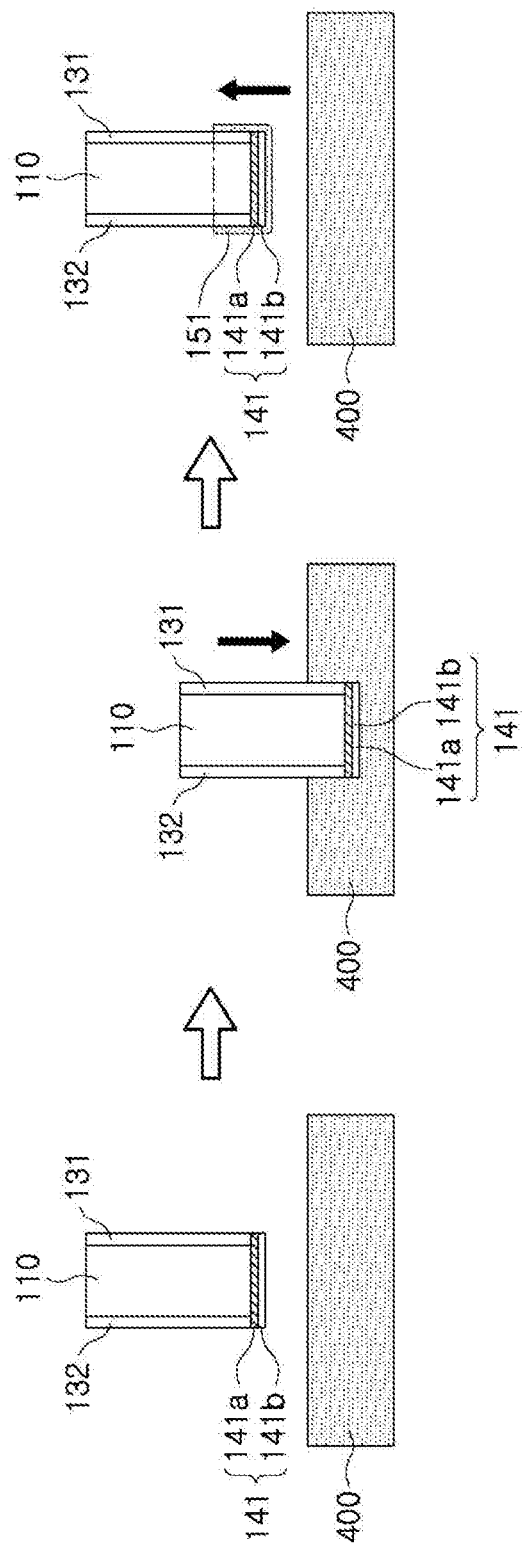
FIG. 12 is a diagram illustrating processes for forming an external electrode on a connecting portion of a capacitor component according to an example embodiment of the present disclosure.

Once the body 100 is formed the external electrodes 151 and 152 are formed on respective opposing ends of the body 100 by, for example, dipping the body in a conducting paste 400 having the material for the external electrodes 151/152, as shown in FIG. 12. The extent to which the external electrodes 151/152 are disposed on the surfaces connecting the respective opposing surfaces of the body 100 (i.e., the margin portions and the cover portions) is determined by the extent or depth to which the body is dipped in the conductive paste 400.

According to the aforementioned example embodiments, by disposing the connecting portions in the layering portion, capacitance per unit volume of the capacitor component may improve, and moisture resistance reliability may improve.

Also, each of the corners of the body may have a sufficiently rounded shape, and when the each of the corners of the body has a sufficiently rounded shape, each of the external electrodes may have a uniform and reduced thickness.

Further, when the margin portions are disposed on both surfaces of the layering portion, capacitance per unit volume of the capacitor component may improve.

In addition, as the external electrodes include metal powder particles, a surface of each of which is coated with at least one of graphene and carbon nanotubes, resistance may decrease, thereby decreasing ESR.

While the example embodiments have been shown and described above, it will be apparent to those skilled in the art that modifications and variations could be made without departing from the scope of the present invention as defined by the appended claims.

What is claimed is:

1. A capacitor component, comprising:
   a body including
      a layering portion comprising first and second internal electrodes opposing each other and layered in a first direction with a dielectric layer interposed therebetween, and
      first and second connecting portions disposed on opposing surfaces of the layering portion taken in a second direction perpendicular to the first direction and respectively connected to the first and second internal electrodes; and
   first and second external electrodes disposed on the first and second connecting portions, respectively,
   wherein the first and second external electrodes include metal particles and glass, at least one of the metal particles having a surface thereof coated with at least one of graphene or carbon nanotubes, and
   wherein an entire surface of at least one of the metal particles is coated with the at least one of graphene or carbon nanotubes.

2. The capacitor component of claim 1, wherein the first and second connecting portions include a metal layer disposed on the layering portion and a ceramic layer disposed on the metal layer.

3. The capacitor component of claim 2, wherein a thickness of the metal layer is in a range from 1 µm to 10 µm.

4. The capacitor component of claim 2, wherein a thickness of the ceramic layer is in a range from 3 µm to 15 µm.

5. The capacitor component of claim 1, wherein a ratio of a minimum value of a thickness of each of the first and second connecting portions to a maximum value is 0.9 to 1.0.

6. The capacitor component of claim 2, wherein the first and second connecting portions are formed by transcribing a ceramic layer having a sheet form and a metal layer having a sheet form in the second direction.

7. The capacitor component of claim 1, wherein each of corners of the body has a rounded shape.

8. The capacitor component of claim 1, wherein an average thickness of the first and second internal electrodes is in a range from 0.01 µm to 0.4 µm.

9. The capacitor component of claim 1, wherein the layering portion includes a capacitance forming portion comprising the first and second internal electrodes opposing each other with the dielectric layer interposed therebetween, and upper and lower protective portions disposed in an upper portion and a lower portion of the capacitance forming portion.

10. The capacitor component of claim 9, wherein R1/tp is in a range from 0.3 to 1.4, where tp is a thickness of each of the upper protective portion and the lower protective portion, and R1 is a radius of curvature of each of the corners of the body on cross-sectional surfaces taken in the first and second directions.

11. The capacitor component of claim 10, wherein the thickness tp is 20 µm or less.

12. The capacitor component of claim 1, further comprising:
   first and second margin portions disposed on a fifth surface and a sixth surface of the body, respectively, the fifth and sixth surfaces being opposite each other in a third direction perpendicular to the first and second directions.

13. The capacitor component of claim 12, wherein R2/Wm is in a range from 0.3 to 1.4, wherein Wm is a thickness of each of the first and second margin portions, and R2 a radius of curvature of each of the corners of the body on cross-sectional surfaces taken in the second and third directions.

14. The capacitor component of claim 1,
   wherein the body includes first and second surfaces opposing each other in the first direction, third and fourth surfaces opposing each other in the second direction, and the fifth and sixth surfaces opposing each other in a third direction perpendicular to the first and second directions,
   wherein the first and second external electrodes extend to the first surface, the second surface, the fifth surface, and the sixth surface, and
   wherein the first and second connecting portions are connected to the first and second external electrodes.

15. The capacitor component of claim 1, wherein a ratio a minimum value of the thickness tc to a maximum value is in a range from 0.8 to 1.0 where tc is a thickness of each of the first and second external electrodes.

16. A capacitor component, comprising:
   a body including
      a layering portion comprising first and second internal electrodes opposing each other and layered in a first direction with a dielectric layer interposed therebetween, and
      first and second connecting portions disposed on opposing surfaces of the layering portion taken in a second direction perpendicular to the first direction and respectively connected to the first and second internal electrodes; and
   first and second external electrodes disposed on the first and second connecting portions, respectively,
   wherein the first and second connecting portions include a metal layer disposed on the layering portion and a ceramic layer disposed on the metal layer, and
   wherein the first and second external electrodes include metal particles and glass, at least one of the metal particles having an entire surface thereof coated with at least one of graphene or carbon nanotubes.

* * * * *